US006745602B2

(12) United States Patent
Nakasone et al.

(10) Patent No.: US 6,745,602 B2
(45) Date of Patent: *Jun. 8, 2004

(54) QUICK INSTALL DOOR KNOB ASSEMBLY

(75) Inventors: Frank Nakasone, Aliso Viejo, CA (US); Steven Armstrong, Anaheim, CA (US)

(73) Assignee: Newfrey LLC, Newark, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 09/906,229

(22) Filed: Jul. 16, 2001

(65) Prior Publication Data

US 2002/0059696 A1 May 23, 2002

Related U.S. Application Data

(63) Continuation-in-part of application No. 09/721,215, filed on Nov. 22, 2000, now Pat. No. 6,598,440.

(51) Int. Cl.[7] .................................... B60R 25/02

(52) U.S. Cl. .................... 70/224; 70/472; 70/452; 292/357; 292/348; 292/336.3; 16/441

(58) Field of Search .................... 16/412–414, 441; 292/336.3, 347, 348, 352, 353, 357, 356; 70/224, 446, 472, 448–452

(56) References Cited

U.S. PATENT DOCUMENTS

| | | | | | |
|---|---|---|---|---|---|
| 3,994,608 | A | * | 11/1976 | Swiderski et al. | 292/349 X |
| 4,127,342 | A | * | 11/1978 | Coggiola | 16/121 |
| 4,236,396 | A | * | 12/1980 | Surko, Jr. et al. | 70/451 X |
| 4,441,230 | A | * | 4/1984 | Howie, Jr. | 16/121 |
| 4,502,720 | A | | 3/1985 | Fayerman et al. | 292/348 |
| 4,545,607 | A | * | 10/1985 | Yulkowski | 292/216 |
| 5,118,152 | A | | 6/1992 | Lin | 292/356 |
| 5,149,155 | A | | 9/1992 | Caeti et al. | 292/336.3 |
| 5,388,307 | A | * | 2/1995 | Hyde | 16/121 |
| 5,409,278 | A | | 4/1995 | Harcourt | 292/357 |
| 5,590,555 | A | | 1/1997 | Kester et al. | 70/224 |
| 5,598,726 | A | * | 2/1997 | Cordle | 70/224 |
| 5,809,815 | A | * | 9/1998 | Lee | 70/472 |
| 5,960,517 | A | | 10/1999 | Sprekeler | 292/357 |
| 6,038,894 | A | * | 3/2000 | Hu | 70/224 |
| 6,425,273 | B1 | * | 7/2002 | Kim et al. | 70/224 |

* cited by examiner

*Primary Examiner*—Suzanne Dino Barrett
(74) *Attorney, Agent, or Firm*—Richard J. Veltman; John D. Del Ponti

(57) ABSTRACT

The present mechanism provides a quick install lockset mechanism having a semi-permanent mechanical connection between an interior lock assembly and an exterior lock assembly. The exterior lock assembly includes a pair of threaded fasteners extending through a preformed hole in a door, and the interior lock assembly includes a rose liner configured to rotatably engage the fasteners to connect the interior and exterior lock assemblies. The interior lock assembly rose liner includes a pair of raised contoured portions having openings for receiving the fasteners and ramps for guiding the fasteners to the openings. In addition, the interior lock assembly includes a knob insert and a turnpiece guide. The knob insert is disposed in the knob and the turnpiece guide is removably disposed in the knob insert. A turnpiece is disposed in the turnpiece guide and is thereby aligned with an operating member extending from a lock cylinder in the exterior lock assembly. As the interior knob assembly is connected to the exterior knob assembly, the turnpiece guide is pushed out of the knob insert, thereby freeing the turnpiece for co-rotation with the lock cylinder-operating member.

10 Claims, 8 Drawing Sheets

QUICK INSTALL DOOR KNOB ASSEMBLY

The present application is a continuation-in-part of application Ser. No. 09/721,215 filed Nov. 22, 2000 and now U.S. Pat. No. 6,598,440.

BACKGROUND AND SUMMARY OF THE INVENTION

This invention relates generally to a lockset mechanism for a door assembly, and more specifically to apparatus and a method for establishing a semi-permanent mechanical connection between the interior and exterior knob assemblies of a lockset mechanism. The invention applies equally well to knobs, leversets, and handlesets, or other lockset mechanisms.

In conventional locksets, the interconnection between the interior and exterior rose assemblies is established by the use of threaded fasteners. The exterior rose assembly typically includes two internally threaded bosses that align with two apertures formed on the interior rose assembly. Standard machine screws are inserted into the interior rose apertures and are brought into alignment with and threadingly engage the threaded bosses formed on the exterior rose assembly. Tightening the screws closes the interior and exterior roses toward each other, thereby trapping the door therebetween.

There are numerous disadvantages to this conventional method of establishing a semi-permanent mechanical connection between the interior and exterior rose assemblies of the lockset. In particular the access to the screw heads may be partially concealed behind the doorknob making manipulation awkward. In addition, the screws typically used for this purpose are relatively long (often 1 inch or more in total length) to permit a single lockset to accommodate doors of varying thicknesses, typically in the range of 1⅜ to 1¾ inches. The length of the screws requires that the screws be turned many times when the lockset is being installed on thinner doors, thereby reducing the speed of installation. Furthermore, the bosses must be internally threaded deeply enough to accommodate the length of the screws when the lockset mechanism is installed on thinner doors. Such deep internally threaded features are difficult to produce in high volume and add to the cost of manufacture. The use of conventional machine screws in the installation of the lockset requires that the installer have an appropriate tool available to drive the screws. The use of such tools in connection with the awkward access to the screw heads due to concealment by the doorknob creates significant risk of cosmetic damage to the interior rose should the tool slip off the screw head. If such damage occurs, the installer may be required to remove and replace the interior rose and knob assembly, particularly in new construction applications. Moreover, the risk of cosmetic damage also discourages the use of power drivers, thereby further reducing the speed of installation.

Alignment of the interior assembly with the exterior assembly is another problem with conventional lockset installation. In particular, it has been difficult to align a turnpiece on the interior knob assembly with the lock spindle extending from the exterior knob assembly.

The present invention overcomes these disadvantages and others by providing a quick install lockset that eliminates the risk of cosmetic damage and eliminates misalignment between the interior and exterior knob assemblies.

These and other features and advantages of the present invention will become apparent from the following description when viewed in accordance with the accompanying drawings and appended claims.

DETAILED DESCRIPTION OF THE INVENTION

With reference to the figures, the present invention is directed to a lockset mechanism that may be readily secured to door assemblies having various thicknesses. The lockset mechanism has certain design features that facilitate proper alignment of the lockset mechanism and rapid assembly and installation thereof.

Figure 1:
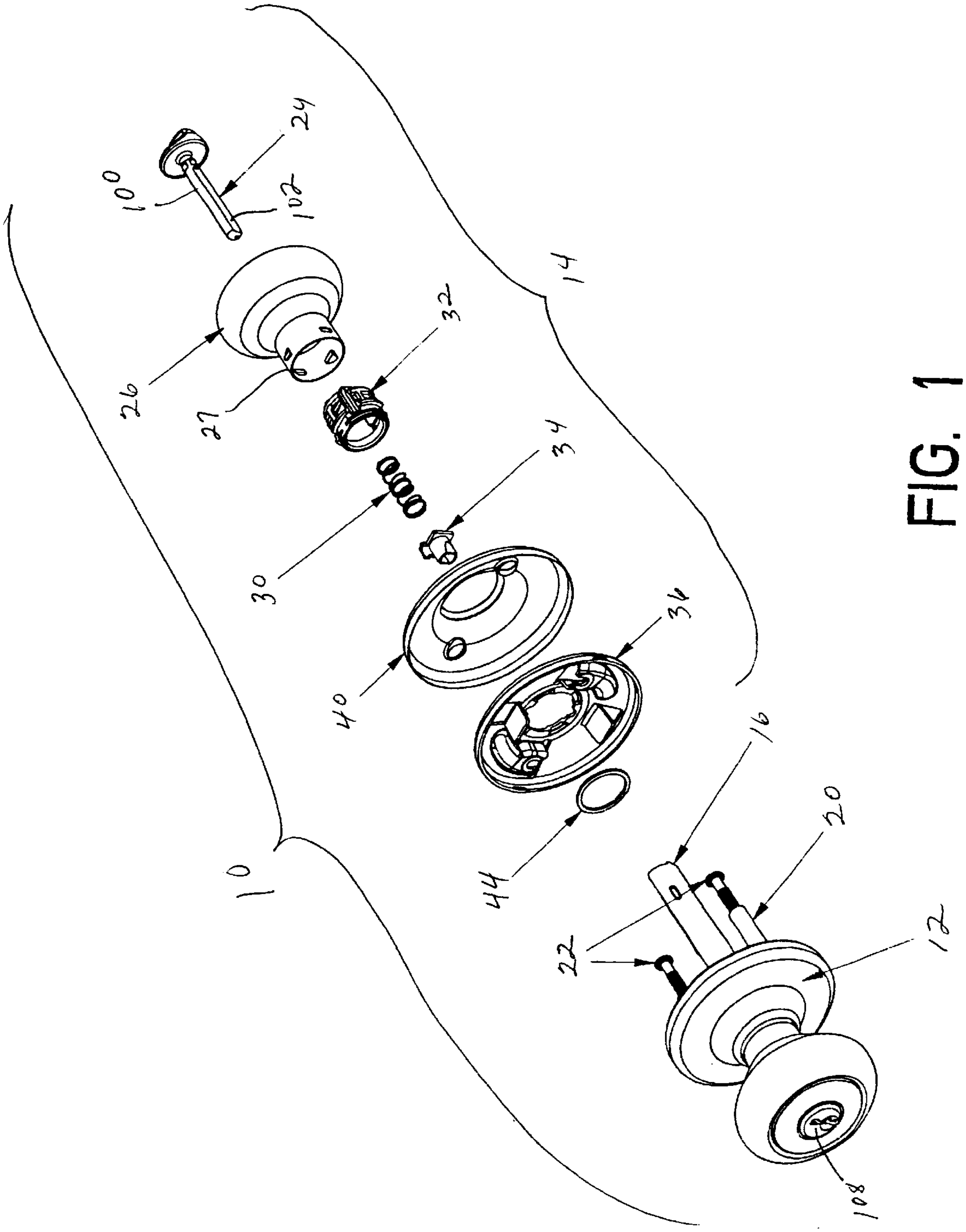
FIG. 1 is an exploded perspective view of a lockset mechanism in accordance with a preferred embodiment of the present invention.
Figure 2:
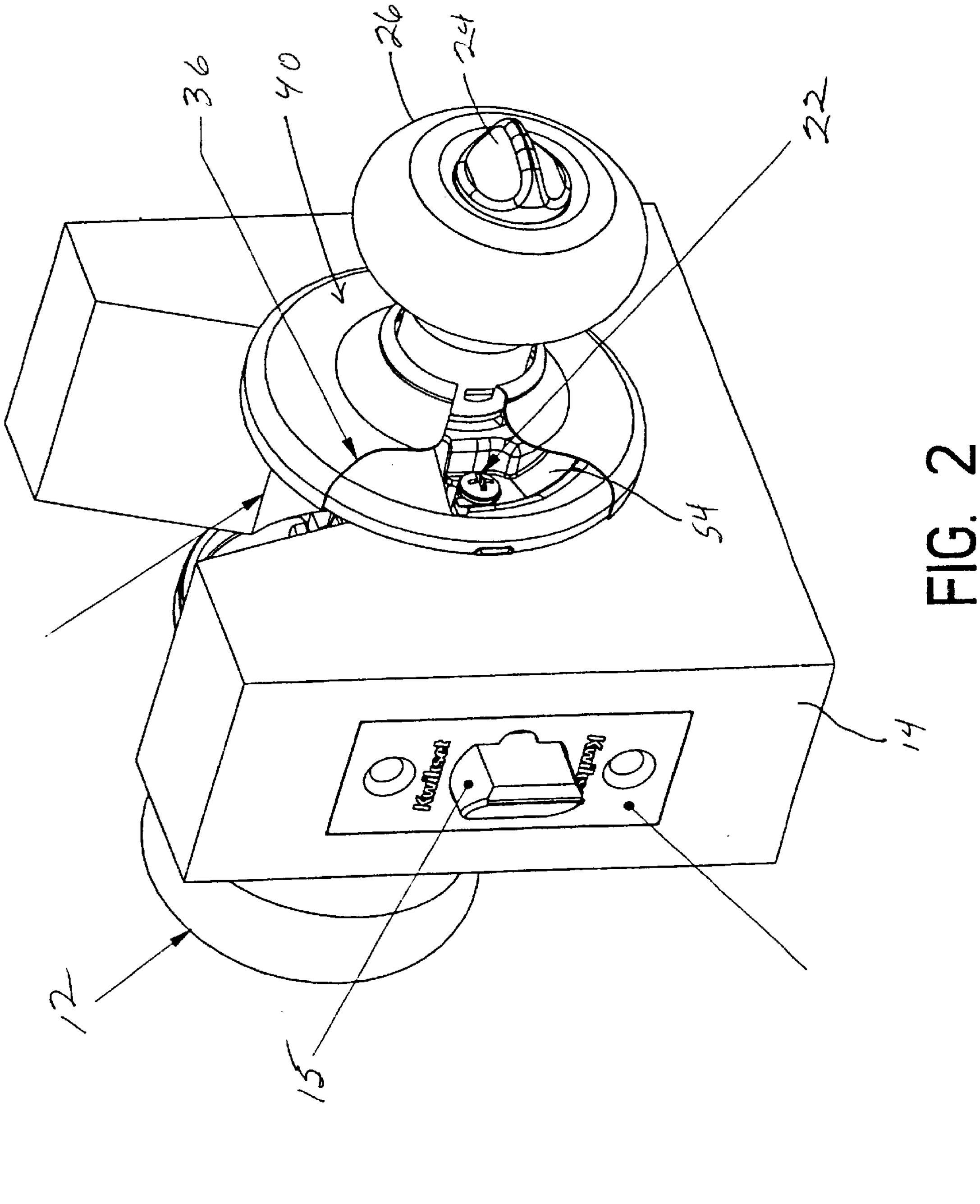
FIG. 2 illustrates the lockset mechanism of FIG. 1 partially assembled in a (partially cut away) door.
Figure 8:
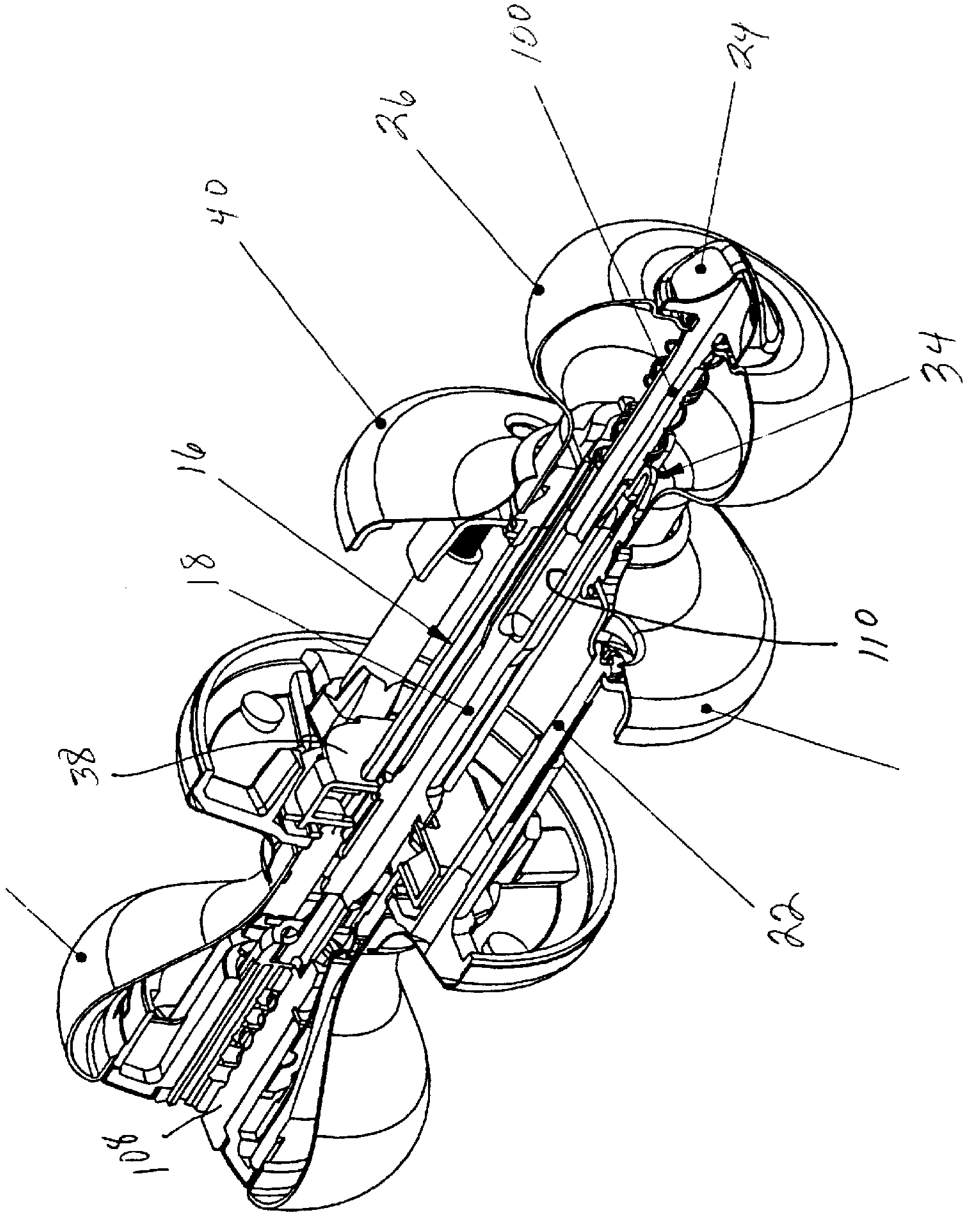
FIG. 8 is a partially cut away perspective view of the assembled lockset mechanism of FIG. 1.

FIG. 1 illustrates a preferred embodiment of a lockset mechanism 10 including an exterior knob assembly 12, an interior knob assembly 14, and a latch assembly 15 (FIG. 2). The exterior knob assembly 12 includes a half-round 16, a full round 18 (FIG. 8), a torque spring assembly 38 (FIG. 8), and a pair of stems 20 which are adapted to receive screws 22 for providing a location onto which the interior knob assembly 14 may be releasably secured. The interior knob assembly 14 includes a turnpiece 24, a knob 26 having a sleeve 27, a turnpiece spring 30, a knob insert 32 staked into the sleeve 27, a turnpiece guide 34, a rose liner 36 with a decorative cover 40, and a retainer ring 44.

Figure 3:
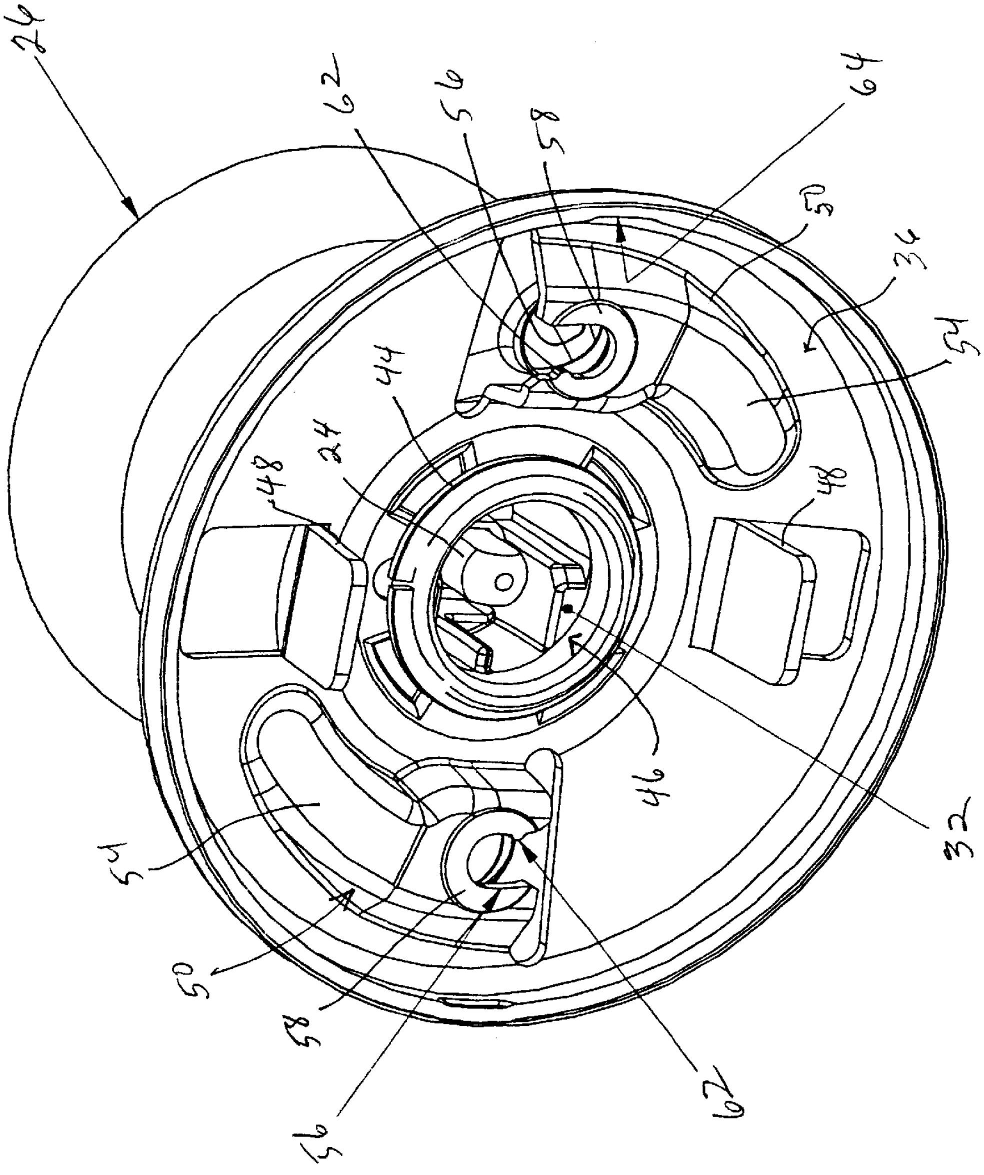
FIG. 3 is a perspective view of the interior knob assembly for use with the lockset of FIG. 1.
Figure 4:
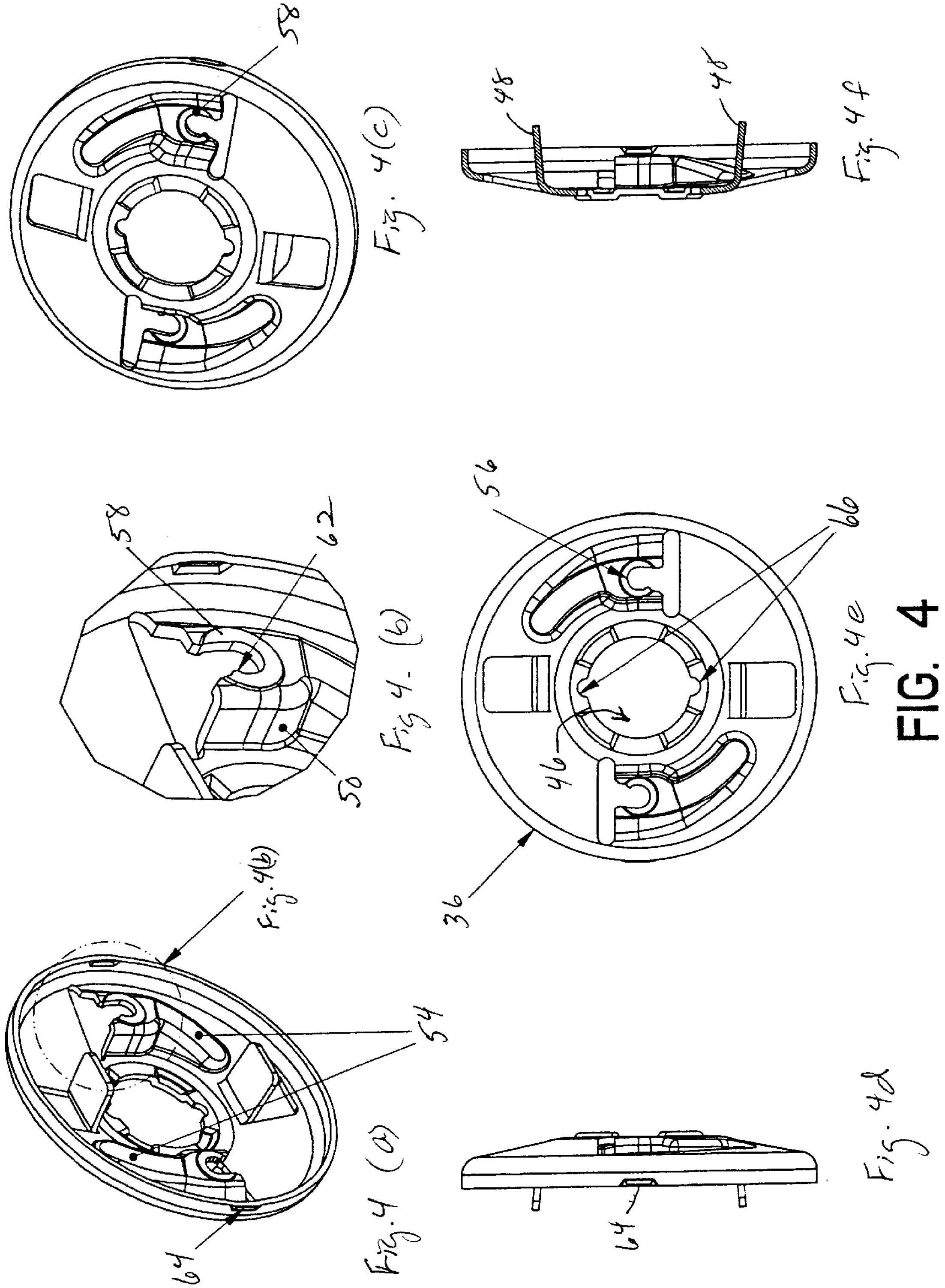
FIGS. 4*a*–4*f* illustrate various views of an interior rose liner for use with the lockset mechanism of FIG. 1.
Figure 5:
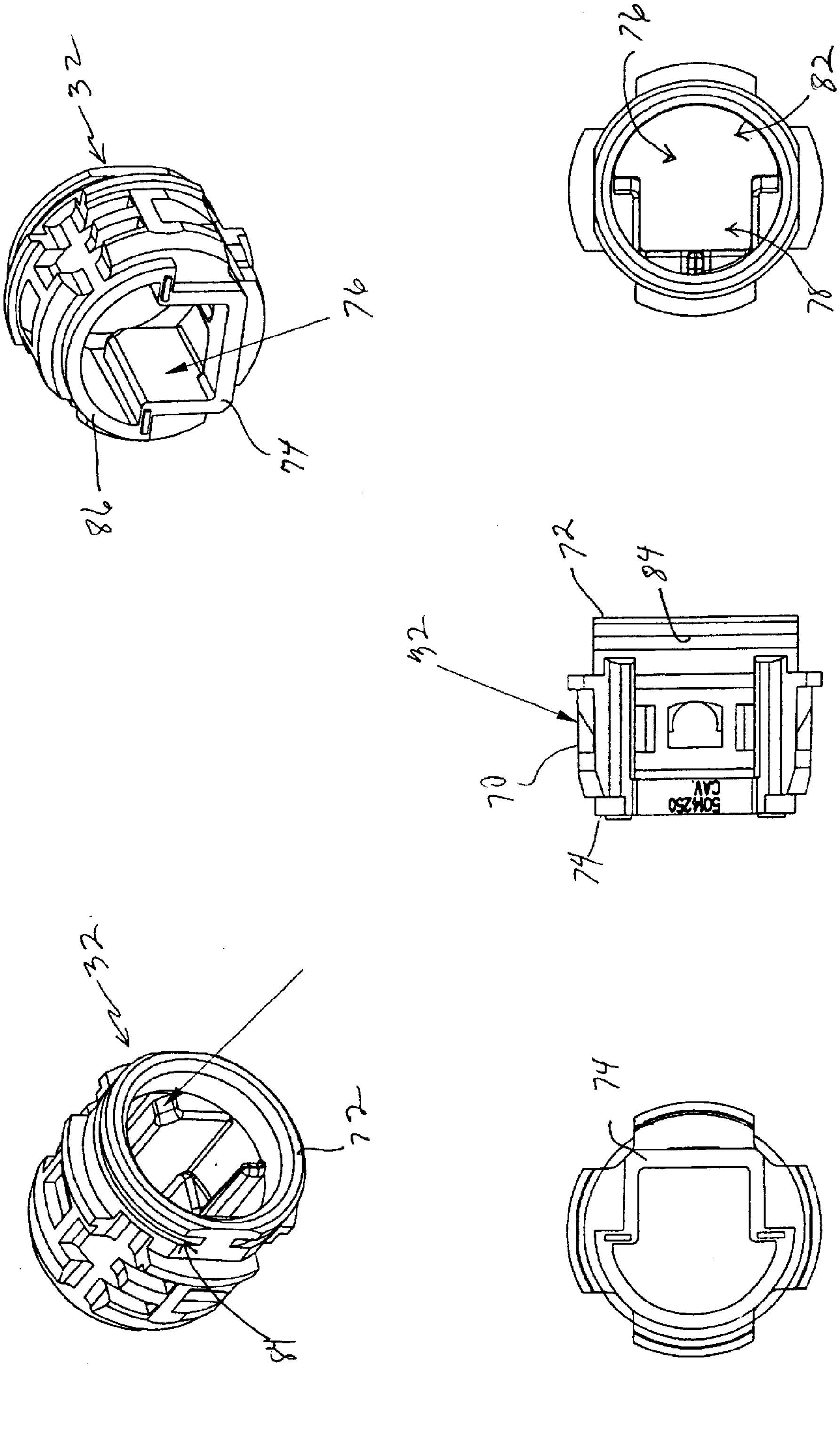
FIGS. 5*a*–5*e* illustrate various views of a knob insert for use with the lockset mechanism of FIG. 1.

As illustrated in FIGS. 3–4, the interior rose liner 36 includes a central aperture 46, a pair of internally extending tabs 48, and a pair of raised contoured sections 50 configured to capture the screws 22. Each contoured section 50 includes a ramp 54 that leads to an opening 56 for receiving one of the screws 22. During installation, the ramps 54 help to guide the screws 22 to the opening 56. Each opening 56 includes a coined recess 58 and a detent 62. Detent 62 aids in the initial installation, holding the interior assembly in place while the screws are tightened down. The coined recess 58 and the detent 62 help prevent the interior rose liner 36 from rotating loose over time. The rose liner 36 further includes anti-rotation features 64 to prevent the rose cover 40 from rotating relative to the rose liner 36 and alignment notches 66 formed in the central aperture 46 to aid in the proper alignment of the rose cover 40 on the rose liner 36.

Figure 7:
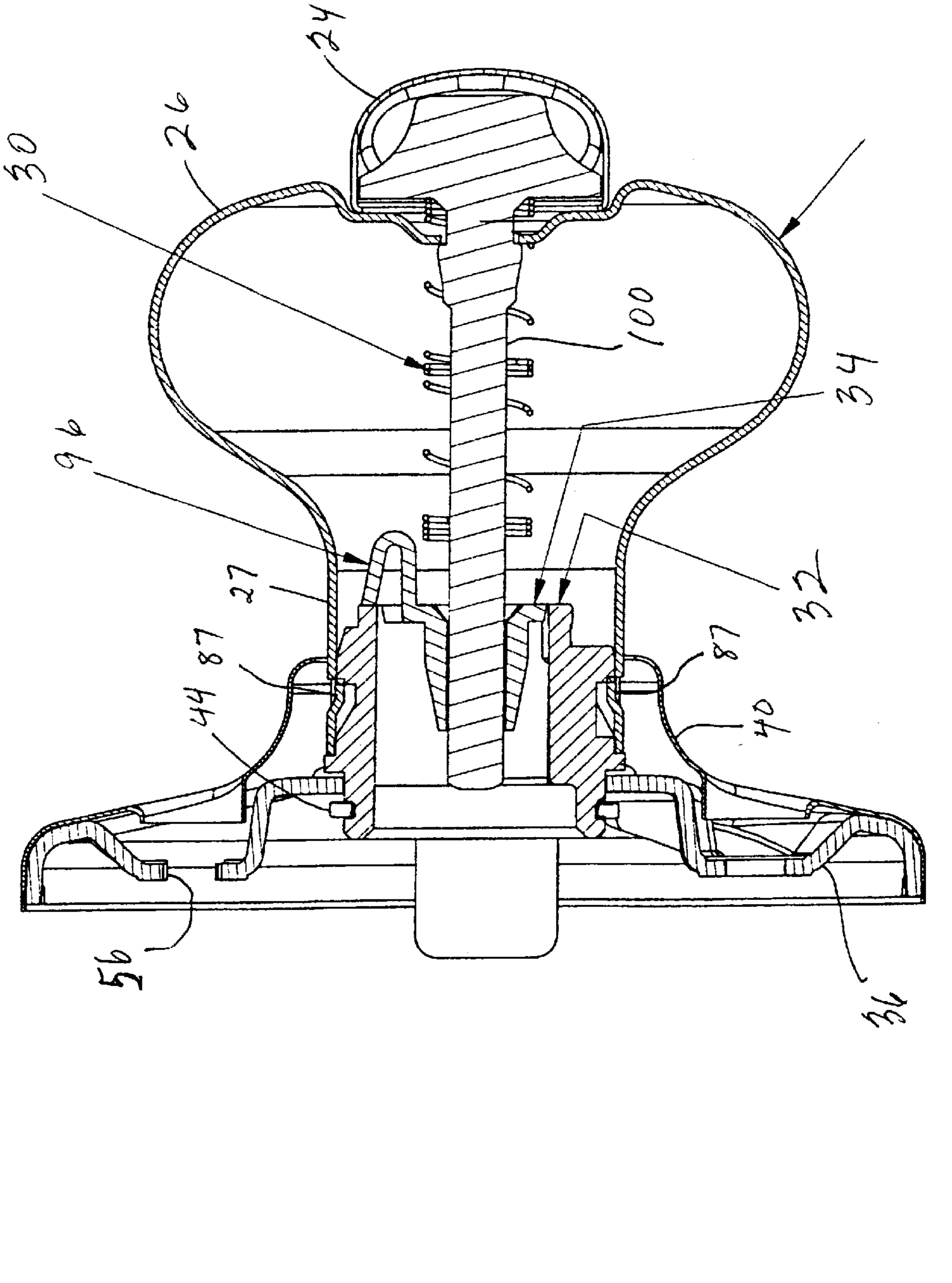
FIG. 7 is a section view taken through the interior knob assembly of FIG. 3.

The central aperture 46 formed in interior rose liner 36 receives and rotatably supports the knob insert 32. As illustrated in FIGS. 5*a*–5*e*, the knob insert 32 is generally cylindrical and includes a generally cylindrical sidewall 70, a proximal end 72, a distal end 74, and a mushroom-shaped central bore 76 extending axially therethrough. The central bore 76 includes a first portion 78 with rectangular cross section and a second portion 82 with a semi-circular cross section. The sidewall 70 includes a groove 84 adjacent the proximal end 72 for receiving the retaining ring 44, as illustrated in FIG. 7, and the distal end 74 includes a mating surface 86. The knob insert 32 is staked into the sleeve 27 as illustrated at 87.

Figure 6:
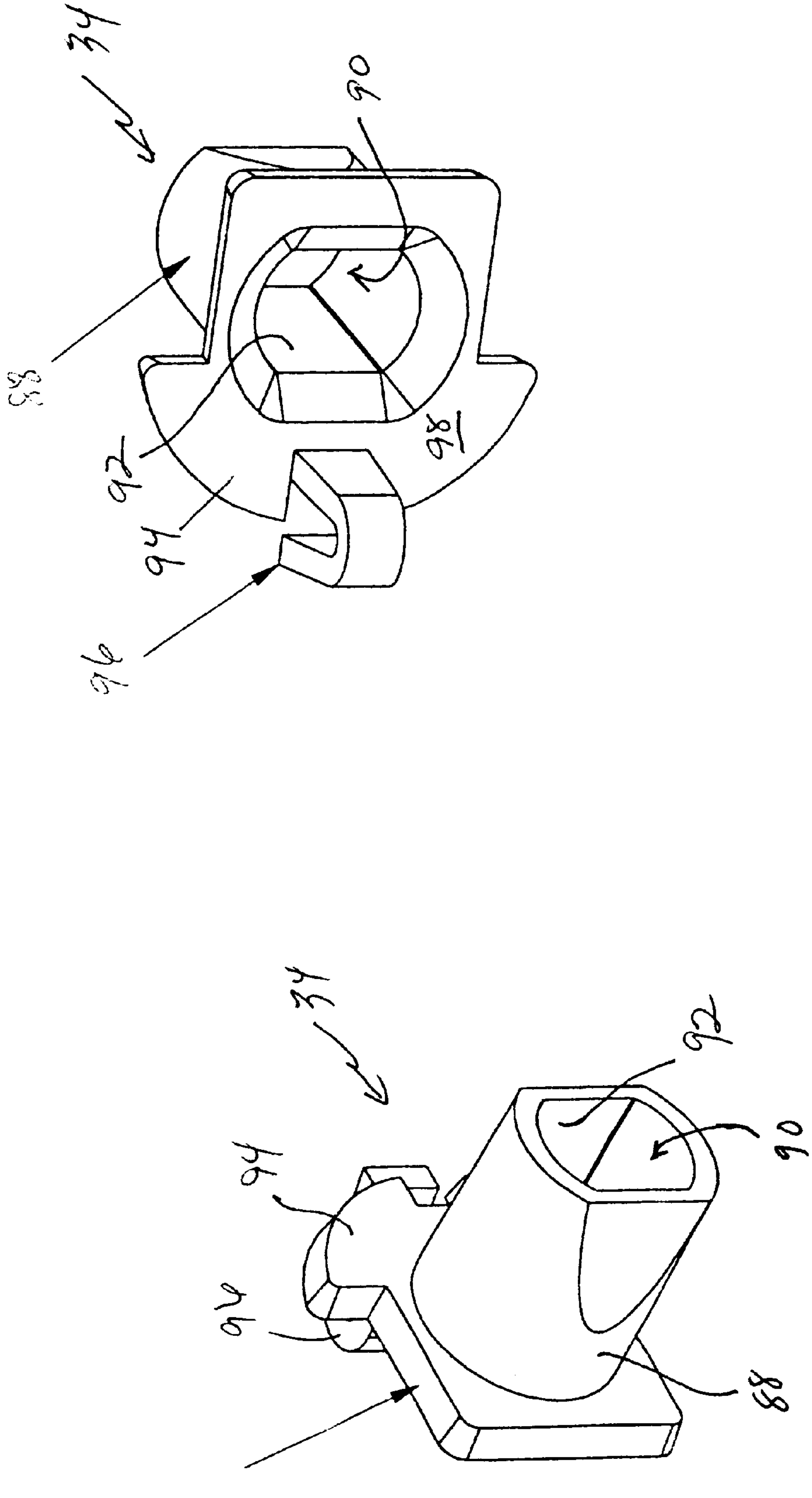
FIG. 6 illustrate opposing views of a turnpiece guide for use with the lockset mechanism of FIG. 1.

The turnpiece guide 34, illustrated in FIG. 6, includes a generally cylindrical body 88 having a guide bore 90 with a pair of matching opposed flats 92, a mushroom-shaped flange 94 extending radially from one end of the cylindrical body 88, and a U-shaped tang 96 extending from the flange 94. The flange 94 is sized and configured to sit in the mushroom shaped bore 76 of the knob insert 32 with the proximal surface 98 of the flange 94 being flush with, and the tang 96 abutting, the distal end 74 of the knob insert 32, as illustrated in FIG. 7. The turnpiece 24 includes a shank 100 formed with matching opposed flats 102 (FIG. 1). The flats 102 engage the flats 92 in the guide bore 90 to prevent rotation of the turnpiece 24 relative to the knob 26 when the shank 100 is in the guide bore 90 and the turnpiece guide 34 is disposed in the knob insert 32.

As best illustrated in FIG. 2, a user installs the exterior knob assembly 12 from the exterior side of the door 14 such that the screws 22 and half-round 16 extend through the latch assembly 15. The user aligns the mushroom shaped bore 76 of insert 32 with the end of half round 16 and rotates interior rose liner 36 counterclockwise to guide the screws 22 along the ramps 54 to the openings 56. When the screws 22 pass the openings 56, the rose liner 36 and knob 26 move toward the door and allow the user to rotate the rose liner 36 clockwise to move the screws 22 into the openings 56 past the detents 62 and into the coined recess 58. The detents 62 and the coined recess 58 cooperate to reduce the likelihood that the knob 26 and rose liner 36 will inadvertently come loose. Preferably, the screws 22 are preset at the factory such that a minimum number of turns are required to fully tighten the screws 22.

Lockset mechanism 10 may be readily adapted to provide a locking function in applications such as entry doors and privacy doors. In these applications, a lock cylinder 108 (FIGS. 1 and 8) is operably coupled through lockset mechanism 10 in a conventional manner. Lockset mechanism 10 includes full-round 18 which is operably coupled at one end to the lock cylinder 108 and which extends axially inwardly toward interior knob assembly 14. The full round 18 of the exterior knob assembly 12 includes a blind bore 110 to receive the shank 100 of the turnpiece 24. The blind bore 110 is configured with a pair of longitudinally extending flats that match the flats on the shank 100 of the turnpiece 24. When properly installed, turnpiece shank 100 is received within the blind bore 110 formed in full-round 18 for co-rotation. One skilled in the art will readily recognize that proper alignment must be achieved between turnpiece 24 and full-round 18 to provide for proper installation of lockset mechanism 10.

The present invention facilitates quick and easy alignment of the turnpiece 24 and the full-round 18 by the combination of the knob insert 32 and the turnpiece guide 34. The turnpiece guide 34 fits in the distal end 74 of the insert 32 with the mushroom-shaped flange 94 received in the mushroom-shaped bore 76, thereby preventing relative rotational movement between the turnpiece guide 34 and the knob insert 32. The matching opposed flats 92 in the guide bore 90 of the turnpiece guide 34 and the shank 100 of the turnpiece 24 prevents relative rotational movement between the turnpiece 24 and the turnpiece guide 34 and properly aligns the shank 100 for insertion into the blind bore 110. Thus, the combination of the turnpiece guide 34 and the insert 32 ensures proper alignment of the shank 100 with the full-round 18.

The assembly and installation of lockset mechanism 10 will now be described. The interior knob assembly is assembled by inserting the turnpiece 24 into the knob 26 (which has insert 32 already staked on) and installing the spring 30 on the shank 100. The turnpiece guide 34 is installed on the shank 100 and placed in the insert 32, with the flange 94 engaging the bore 76 of the knob insert 32. The turnpiece guide 34 is pressed into insert 32, compressing spring 30. This continues until the U-shaped tang 96 clears and engages the distal end 74 of insert 32. The knob/insert sub-assembly is installed in the central aperture 46 of the rose liner 36 and the decorative cover 40, and the outer retaining ring 44 is installed in the outer groove 84 to couple the rose liner 36 to the knob insert 32.

It is hereby assumed that the latch assembly 15 has already been installed in the door. Initially, exterior knob assembly 12 is inserted through a bore formed in door with half-round 16 and stems 20 passing through openings in the latch 13. The interior knob assembly 14 is aligned with the exterior knob assembly 12 with the half-round 16 entering the mushroom-shaped bore 76 in the knob insert 32. Because of the alignment of the turnpiece guide 34 and the knob insert 32, the turnpiece shank 100 is aligned for entry into the blind bore 110. Simultaneously, the user aligns the openings 56 with the screws 22 and moves the interior knob assembly 14 axially toward the exterior knob assembly 12. This axial movement of the interior knob assembly 14 causes the full-round 18 to engage the shank 100 of the turnpiece guide 34. Further axial positioning of interior knob assembly 14 relative to exterior knob assembly 12 urges turnpiece guide 34 out of engagement with insert 32, thereby freeing the turnpiece 24 for rotation with the full round 18. When the screws 22 are positioned adjacent the openings 56, the user rotates the interior knob assembly 14 to move the screws 22 past the detents 62 into the openings 56. The user then tightens the screws to affix the interior knob assembly 14 to the door. As presently preferred, screws 22 need only be rotated a few turns since the position of the screws with respect to exterior knob assembly 12 have been pre-positioned to a pre-set depth depending on a predetermined door thickness based on the function of the lockset, i.e., entry, privacy, passage, classroom, vestibule, etc.

While the present invention has been described with particular reference to a preferred embodiment of a lockset mechanism, one skilled in the art will recognize that the present invention may be readily adapted to embodiments other than those described with reference to the preferred embodiments. Furthermore, those skilled in the art will readily recognize from the foregoing discussion and accompanying drawings and claims, that changes, modifications and variations can be made in the present invention without departing from the spirit and scope thereof as defined in the following claims.

What is claimed:

1. A quick install door knob assembly comprising:

a first knob assembly disposed on one side of a door and having a coupling member configured to extend through a hole in the door;

a second knob assembly disposed on the other side of the door and including means for engaging the coupling member, the means for engaging defining a coupling member-receiving opening and including a ramp for guiding the coupling member to the coupling member-receiving opening, wherein the means for coupling further defines a coined portion adjacent the coupling member-receiving opening and a detent.

2. A quick install door knob assembly mechanism comprising:

a first knob assembly coupled to a latch mechanism; and a second knob assembly coupled to the latch mechanism, the second knob assembly including a knob, a turnpiece having a shank, a knob insert and a turnpiece guide, the knob insert being disposed in the knob, the turnpiece guide being configured to engage the knob insert and the turnpiece shank.

3. The quick install door knob assembly of claim 2, wherein the first knob assembly includes a first operating member for rotationally coupling the first knob assembly to the second knob assembly, the first operating member moving the turnpiece guide from a first position to a second position, the turnpiece being rotationally locked to the second knob assembly when the turnpiece guide is in the first position and rotationally unlocked when the turnpiece guide is in the second position.

4. The quick install door knob assembly of claim 3 wherein the first knob assembly includes a second operating member configured to engage the shank, the shank being aligned with the second operating member when the turnpiece guide is in the first position.

5. A quick install door knob assembly comprising:

a first knob assembly coupled to a latch mechanism; and a second knob assembly coupled to the latch mechanism, the second knob assembly including a knob, a turnpiece having a shank, a knob insert and a turnpiece guide, the knob insert being disposed in the knob, the turnpiece guide being configured to engage the knob insert, wherein at least a portion of the turnpiece guide is configured for movement into and out of the knob insert, the shank being aligned relative to the first knob assembly when the at least a portion of the turnpiece guide is disposed in the knob insert.

6. The quick install door knob assembly of claim 5 wherein the turnpiece is rotationally locked to the knob when the at least a portion of the turnpiece guide is disposed in the knob insert and is rotatable relative to the knob when the at least a portion of the turnpiece guide is disposed outside the knob insert.

7. A quick install door knob assembly comprising:

a first knob assembly having a first operating member and a second operating member;

a second knob assembly;

a knob insert coupled to the second knob assembly;

a turnpiece having a shank; and a turnpiece guide disposed in the knob for movement between an engaged position and a disengaged position and configured to receive the turnpiece shank, wherein the first operating member engages the knob insert and moves the turnpiece guide Presently Presented to the disengaged position.

8. The quick install door knob assembly of claim 7 wherein the turnpiece shank engages the second operating member and is free to rotate relative to the second knob assembly when the turnpiece guide is in the disengaged position.

9. A quick install door knob assembly comprising:

a first knob assembly including a first knob and a rod member extending axially away from the first knob, the rod member having a blind bore formed in an end thereof and opening away from the first knob, and a coupling member;

a second knob assembly including a second knob, a sleeve extending toward the first knob assembly, a turnpiece having a turnpiece shaft extending into the sleeve, and means for engaging the coupling member;

a turnpiece guide received within the sleeve and having an aperture formed therein, the turnpiece shaft being received within the aperture such that the turnpiece guide is slidably positionable along the turnpiece shaft from an engaged position for fixing the turnpiece shaft with respect to the sleeve and a disengaged position for releasing the turnpiece shaft with respect to the sleeve, wherein the turnpiece shaft is substantially aligned with the blind bore when the turnpiece guide is in the engaged position.

10. A quick install door knob assembly comprising:

a first knob assembly including a coupling member;

a second knob assembly including means for engaging the coupling member; and a locking member interdisposed between the first and second knob assemblies, the locking member being rotatably positionable from an unlocked position, wherein the second knob assembly is substantially uncoupled from the first knob assembly, to a locked position wherein the lock cylinder assembly is substantially coupled to the first knob assembly upon rotation of the second knob assembly, the locking member being further rotatably positionable from the locked position to the unlocked position upon counter-rotation of the second knob assembly.

* * * * *